United States Patent
Chen

(10) Patent No.: US 6,213,586 B1
(45) Date of Patent: Apr. 10, 2001

(54) METHOD AND APPARATUS FOR CONTROLLING A MULTICOLOR INKJET PRINTHEAD TO PRODUCE TEMPORALLY OR SPATIALLY SHINGLED IMAGES

(75) Inventor: Iue-Shuenn Chen, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/063,462

(22) Filed: Apr. 20, 1998

(51) Int. Cl.[7] .................................................. B41J 2/21
(52) U.S. Cl. ............................................................ 347/43
(58) Field of Search ............................. 347/43, 33, 29, 347/15, 40

(56) References Cited

U.S. PATENT DOCUMENTS

| | | | |
|---|---|---|---|
| 5,111,302 | * 5/1992 | Chan et al. | 347/43 |
| 5,473,446 | * 12/1995 | Perumal, Jr. et al. | 347/43 |
| 5,500,662 | * 3/1996 | Watanabe | 347/43 |
| 5,509,085 | * 4/1996 | Kakutani | 382/167 |
| 5,672,016 | * 9/1997 | Miyano | 347/43 |
| 5,841,549 | * 11/1998 | Munakata | 347/43 |
| 5,959,646 | * 9/1999 | Bates et al. | 347/43 |

* cited by examiner

Primary Examiner—N. Le
Assistant Examiner—Shih-wen Hsieh
(74) Attorney, Agent, or Firm—Jerry R. Potts

(57) ABSTRACT

A system incorporating the invention controls ink deposition from a multi-orifice inkjet printhead. The printhead is adapted to deposit shingled dots, of plural colors, during multiple passes across a media sheet. The system includes an image buffer which stores image data, the data configured into plural color planes, each color plane including single color subpixels. Each subpixel is a multibit value that is representative of a color intensity. Multiple color plane deposition masks are stored for use with subpixel data from associated color planes, each color plane deposition mask including plural threshold values. Subpixel values from each color plane are compared with logically corresponding threshold values from an associated color plane deposition mask and print control signals are produced in accordance with the comparing action. If the subpixel value equals or exceeds an associated threshold value, a print signal is issued and if not, a no-print action occurs. A printer control procedure is responsive to the print control signals to control colored ink ejections from the respective nozzles on the inkjet printhead, during each pass across a media sheet, to either deposit a corresponding color dot on the media sheet or to inhibit deposition thereof.

9 Claims, 3 Drawing Sheets

METHOD AND APPARATUS FOR CONTROLLING A MULTICOLOR INKJET PRINTHEAD TO PRODUCE TEMPORALLY OR SPATIALLY SHINGLED IMAGES

RELATED APPLICATIONS

This Application is related to the following U.S. patent applications: Ser. No. 08/606,468 entitled "High Speed System for Grey Level Image Scaling, Threshold Matrix, now U.S. Pat. No. 5,771,605 Alignment and Tiling and Creation of a Binary Halftone Image" to Rust et al.; Ser. No. 08/610,311, entitled "High Speed System for Image Scaling" to Fujii et al.; now U.S. Pat. No. 5,778,158 and Ser. No. 08/610,683, entitled "High Speed System for Threshold Matrix Alignment and Tiling, now U.S. Pat. No. 5,781,308 During Creation of a Binary Halftone Image" to Fujii et al.

FIELD OF THE INVENTION

This invention relates to control of a multicolor inkjet printhead as it deposits multiple ink colors on a media sheet during plural overlapping scans and, more particularly, to a method and apparatus which produces either temporally or spatially shingled images in a manner which reduces image artifacts.

BACKGROUND OF THE INVENTION

"Shingling" of ink drops to produce inkjet images is known in the prior art. In inkjet printers which produce binary colors (i.e., black/white), shingling is accomplished by causing the inkjet printhead to make at least two passes over a single swath of raster scan lines of print data. During a first scan, every other pixel site is masked and during a second scan, the complementary pixel sites are masked. Ink deposited during a first scan is thus placed at every other pixel site and is allowed to dry before ink is placed on adjacent pixel sites during the second scan.

Multi-level shingling is also known in the prior art. In such a shingling procedure, instead of firing one drop per pixel site, the inkjet printhead is enabled to fire plural drops at each pixel site. The number of overlapping drops (and their respective volumes) is dependent upon the number of drops, one on top of each other, that can be accommodated while still retaining a desired level of image quality. Such a print technique is termed "drop-on-drop". Multi-level shingling is utilized to enable the deposition of various thicknesses of colored inks to achieve a desired level of color intensity.

Currently, inkjet printers have the capability of producing high quality images. Such printers utilize a printhead (e.g. whose nozzle plate 10 is as schematically shown in FIG. 1) which is capable of depositing four separate color dots, i.e., cyan (C), magenta (M), yellow (Y) and black (K). Nozzle plate 10 includes at least four columns of nozzles 11, 12, 13 and 14, with each column having N nozzles devoted to the deposition of a single color. The number of nozzles in each column defines the width of a swath of pixel sites that can be printed during a scan of the printhead across a media sheet. Further, there may be plural columns of nozzles devoted to each color.

Prior art printheads, of the type shown in FIG. 1, are controlled such that, as each column of nozzles arrives over a pixel position, in the sequence of nozzles shown, a respective nozzle is energized to deposit a color dot of ink. Such multi-color printheads have only been enabled to deposit a single dot per pixel site, with the deposition occurring in the order in which the color nozzles are arranged across nozzle plate 10. Thus, as shown in FIG. 1, if the scan direction is as shown by arrow 15, a magenta ink dot is invariably deposited before a cyan dot is deposited. Such invariant ordering of dot placement, at times, results in image artifacts and variations from a desired color representation.

It is known that both temporal and spatial shingling can improve image representations that are produced by an inkjet printhead (e.g., improved gray level representation and half-toning). Further, as above indicated, experience has shown that if the deposition of colors onto a media sheet is restricted to a certain order of color dots, undesirable image artifacts can be created (e.g., banding). Finally, there is a requirement to improve the image reproduction capability of inkjet printers to enable image representations to be produced that are closer to high quality photographic reproductions.

Accordingly, it is an object of this invention to provide an improved method and apparatus for controlling a multicolor inkjet printer.

It is a further object of this invention to provide an improved method and apparatus for controlling a multicolor inkjet printhead, wherein either temporally or spatially shingled images are produced.

It is yet another object of this invention to provide an improved method and apparatus for control of a multicolor inkjet printhead, wherein the sequence of deposition of colored dots is selectively alterable.

It is still another object of this invention to provide a method and apparatus for control of a multicolor inkjet printhead which reduces image artifacts in a resultant printed image.

SUMMARY OF THE INVENTION

A system incorporating the invention controls ink deposition from a multi-orifice inkjet printhead. The printhead is adapted to deposit shingled dots, of plural colors, during multiple passes across a media sheet. The system includes an image buffer which stores image data, the data configured into plural color planes, each color plane including single color subpixels. Each subpixel is a multibit value that is representative of a color intensity. Multiple color plane deposition masks are stored for use with subpixel data from associated color planes, each color plane deposition mask including plural threshold values. Subpixel values from each color plane are compared with logically corresponding threshold values from an associated color plane deposition mask and print control signals are produced in accordance with the comparing action. If the subpixel value equals or exceeds an associated threshold value, a print signal is issued and if not, a no-print action occurs. A printer control procedure is responsive to the print control signals to control colored ink ejections from the respective nozzles on the inkjet printhead, during each pass across a media sheet, to either deposit a corresponding color dot on the media sheet or to inhibit deposition thereof.

DETAILED DESCRIPTION OF THE INVENTION

Figure 2:
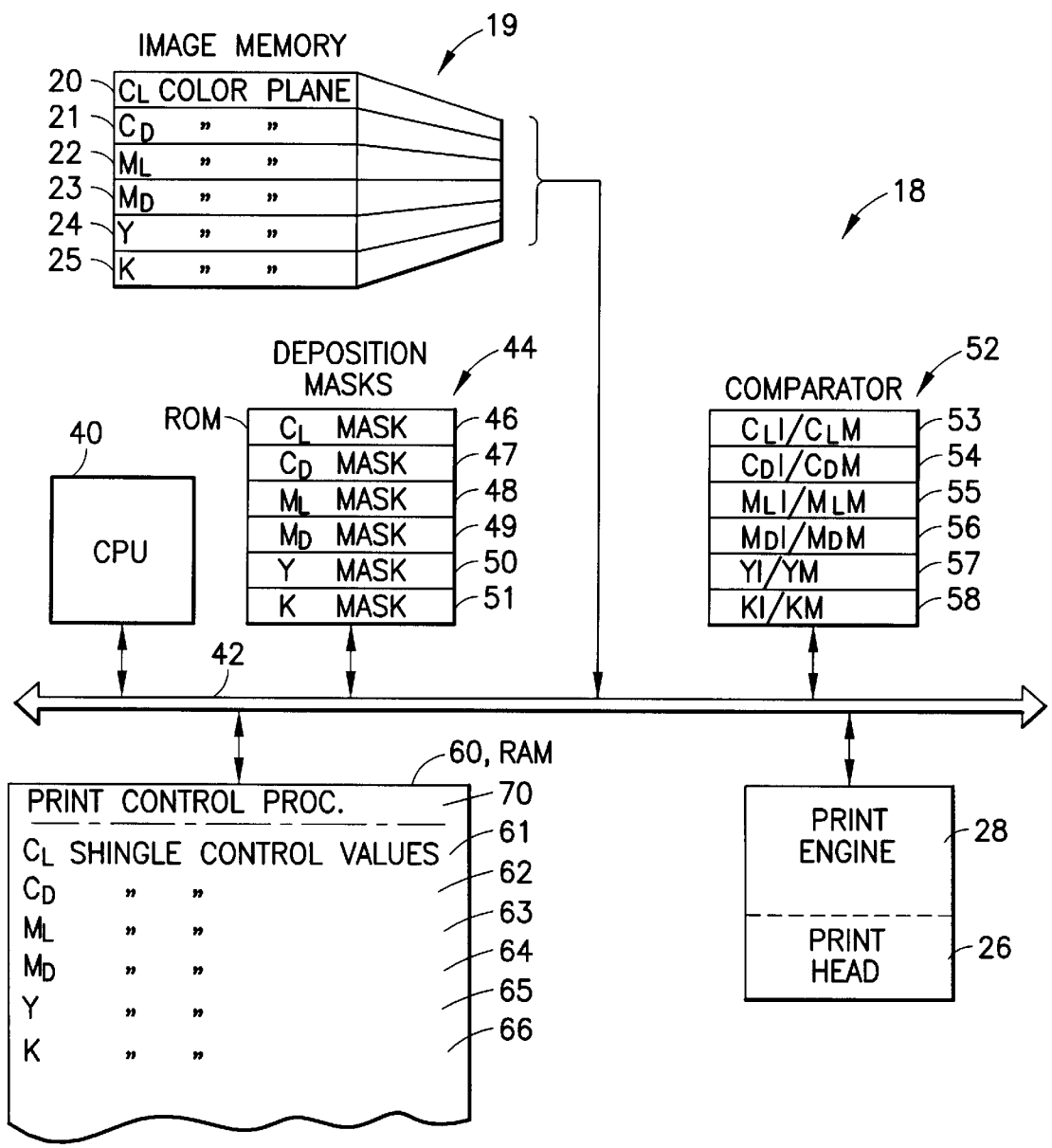
FIG. 2 illustrates a block diagram of a system adapted to carry out the invention hereof.

FIG. 2 illustrates a block diagram of a system 18 for enabling a multi-color inkjet printhead to produce temporally and/or spatially shingled images on a media sheet. System 18 includes an image memory 19 wherein a multi-color image is configured into a plurality of color planes 20, 21, 22, 23, 24 and 25, each one of which includes subimage color values for the image. In the following discussion, it will be assumed that each subimage color value is comprised of three bits, it being realized, however, that an individual color value may be represented by any number of bits, depending upon the choice of the system designer.

Color plane 20 contains plural 3-bit values which correspond to light cyan ($C_L$) colors. In similar fashion, image planes 21, 22, 23, 24 and 25 include 3-bit values for the following respective colors: dark cyan ($C_D$); light magenta ($M_L$); dark magenta ($M_D$); yellow (Y) and black (K). Each 3-bit value enables up to 8 levels of color saturation to be produced by a printhead 26, contained in print engine 28.

As will become hereafter apparent, print engine 28 and printhead 26 are controlled to execute multiple passes for each print swath that is printed on a media sheet. Each pass of printhead 26 enables a layer of color dots to be deposited on the media sheet, utilizing a dot-on-dot procedure or a dot-next-to-dot procedure. The number of passes made by printhead 26 is dependent upon the number of ink drops of each color ink (e.g., up to four) that can be deposited at a single pixel site. In system 18, six separate color planes are provided in image memory 19 and, printhead 26 is provided with six separate columns of orifices, one for each color plane. Thus, to deposit up to four ink drops of each color ink at each pixel site requires printhead 26 to make at least 4 passes per swath.

During each pass, printhead 26 is caused to deposit drops on the media sheet, each drop exhibiting a volume V/p. V is the total volume of ink that can be deposited at a single pixel site on the media sheet and p is the number of passes used by printhead 26 to print a swath of raster scan lines of image pixels.

Figure 1:
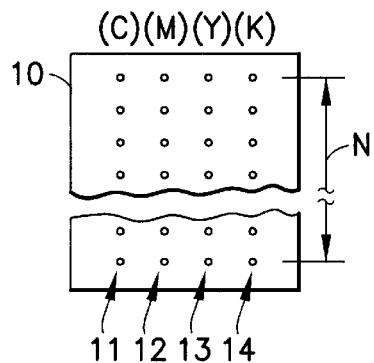
FIG. 1 is a schematic showing of a prior art inkjet printhead nozzle plate.
Figure 3:
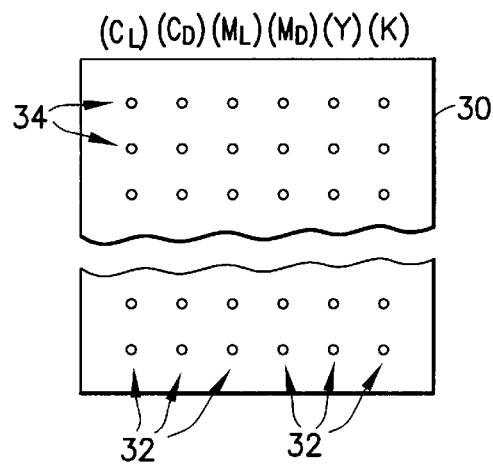
FIG. 3 is a schematic illustration of a nozzle plate of an inkjet printhead included in the print engine utilized by the system of FIG. 2.

Referring to FIG. 3, a schematic diagram illustrates an orifice plate 30 that forms a portion of printhead 26. Orifice plate 30 includes one or more columns 32 of orifices 34 for each color to be printed. Six columns 32 of orifices 34 are illustrated that comprise orifice plate 30, with each column 32 devoted to the deposition of single color ink dots. In a preferred embodiment, each column 32 includes 64 orifices 34, enabling a swath of 64 pixel raster scan lines to be produced during each pass of printhead 26.

Referring back to FIG. 2, it is to be understood that image memory 19 may exist, in part, in a host processor and/or may exist in a random access memory (RAM) within system 18. In either case, individual subpixel color values from each color plane are converted to binary control values which comprise a form of raster bit map for each color plane. Such raster bit maps (one for each color image plane) are used to control print engine 28 and printhead 26 during each scan of printhead 26.

More specifically, a central processing unit (CPU) 40 controls the overall operation of system 18 and is coupled to the other elements thereof via a bus system 42. A read-only memory (ROM) 44 includes a plurality of deposition masks 46, 47, 48, 49, 50 and 51. Each deposition mask comprises a matrix of threshold values, which values are compared to logically corresponding subpixel color values accessed from a respective color plane. The comparison controls whether a specific color dot will be printed or not printed during a scan of printhead 26.

Such comparisons are carried out in comparator 52. Comparator 52 comprises six individual comparison circuits 53–58, one for each color plane in image memory 19. Thus, for instance, comparator 53 compares the light cyan value read from color plane 20 ($C_L$I) to the logically corresponding threshold value contained in light cyan mask 46 ($C_L$M). If the light cyan subpixel value from color plane 20 exceeds or equals the light cyan threshold value from deposition mask 46, a control signal state is issued which enables printhead 26 to print a light cyan dot on the media sheet. By contrast, if the light cyan color value from color plane 20 is less than the light cyan threshold value from deposition mask 46, a control signal state is issued from controller 60 which causes printhead 26 to be inhibited from printing a light cyan dot at the logically corresponding pixel position.

Each control signal state which emanates from comparator 52 is stored in random access memory 60 in one of a plurality of shingle control value sets 61–66. Each shingle control value set 61–66 comprises a raster bit map of binary values which controls the operation of printhead 26. A print control procedure 70 is operative to control the overall operation of system 18, in conjunction with CPU 40.

As will be hereafter understood, deposition masks 44 are designed to control the deposition of colors in such a manner as to avoid image artifacts. Each deposition mask is applied to color plane values during each scan of printhead 26 so as to control the shingling of ink dots during successive scans. While the invention to be described herein assumes that there is one mask per color plane for all scans of printhead 26, the invention further contemplates the use of separate deposition masks, one for each scan of printhead 26, for each color plane. In either case, deposition masks 44 allow for both temporal and spatial shingling to occur during the successive scans of printhead 26 in such a manner as to avoid or reduce image artifacts. As an example, the threshold values contained in each deposition mask are arranged to assure that color intensities and amounts of ink deposited at swath extremities (in the page process direction), closely match between succeeding swaths.

Figure 4:
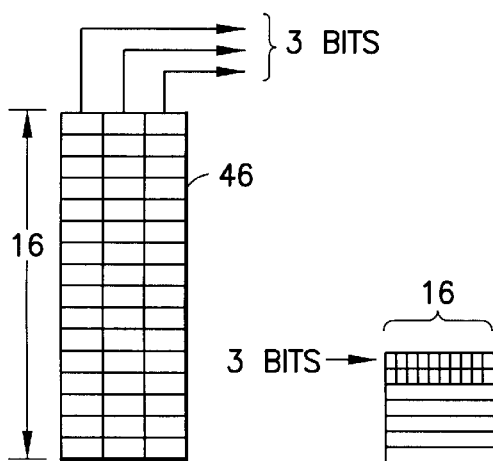
FIG. 4 is a schematic illustration of a color plane deposition mask that is used during the method of the invention.

Referring to FIG. 4, an exemplary deposition mask 46 is illustrated and comprises, for example, a 3×16 matrix of color threshold values, wherein each threshold value is a 3-bit value. During each operation of comparator 52, one 3-bit threshold value is removed from deposition mask 46 and is compared with a logically corresponding 3-bit color value from an associated color plane.

Figure 5:
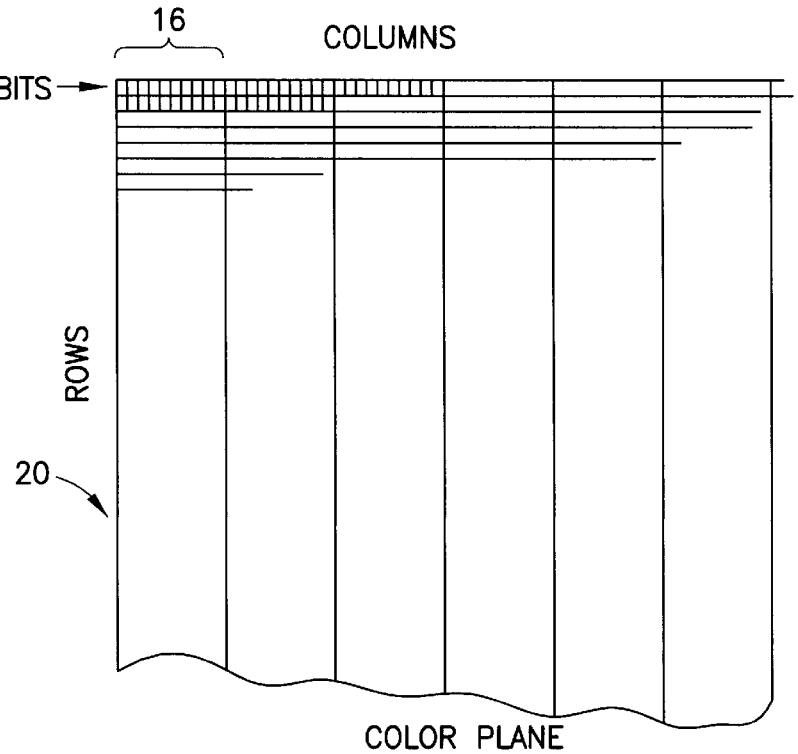
FIG. 5 illustrates a schematic view of an image and shows the logical tiling of a color plane deposition mask across a color plane of subpixels.

FIG. 5 illustrates an exemplary color plane 20 which comprises a plurality of logical rows and columns of 3-bit light cyan color values. During a read-out of color subpixels from a logical row of color plane 20, deposition mask 46 (FIG. 4) is logically tiled across the row so as to enable comparison of its sixteen 3-bit values with each succeeding set of sixteen 3-bit color values from color plane 20. The outputs from each comparison is either a binary 0 or a binary 1, depending upon whether the subpixel color value is less than the threshold value or is equal to or greater than the threshold value. The resulting comparison output value is stored in RAM 61 (FIG. 2) as an entry in a shingle control value set which, as indicated above, is equivalent to a raster image buffer for the particular scan line that has been subjected to the comparison action.

Once a shingle control value set has been derived for all or part of a swath of raster scan lines, print control procedure 70 commences a print action by causing printhead 26 to traverse across the media sheet. As each nozzle on printhead 26 reaches a particular pixel position, the nozzle either deposits a dot of colored ink at the pixel position or does not, dependent upon the specific value contained in the respective shingle control value sets. Thus, if a shingle control value for a particular color plane indicates that a print action should occur, printhead 26 causes a dot of corresponding color ink to be deposited on the media sheet, with the dot having a V/p volume of ink. During each succeeding scan of printhead 26 across the same swath, its operation is similarly controlled by either a same deposition mask or a different deposition mask, as the case may be. Accordingly, both the sequence of color depositions at any pixel site and the Number of deposited shingle layers at any pixel site are completely controllable in accord with the arrangement of the threshold values in the deposition masks.

Figure 6:
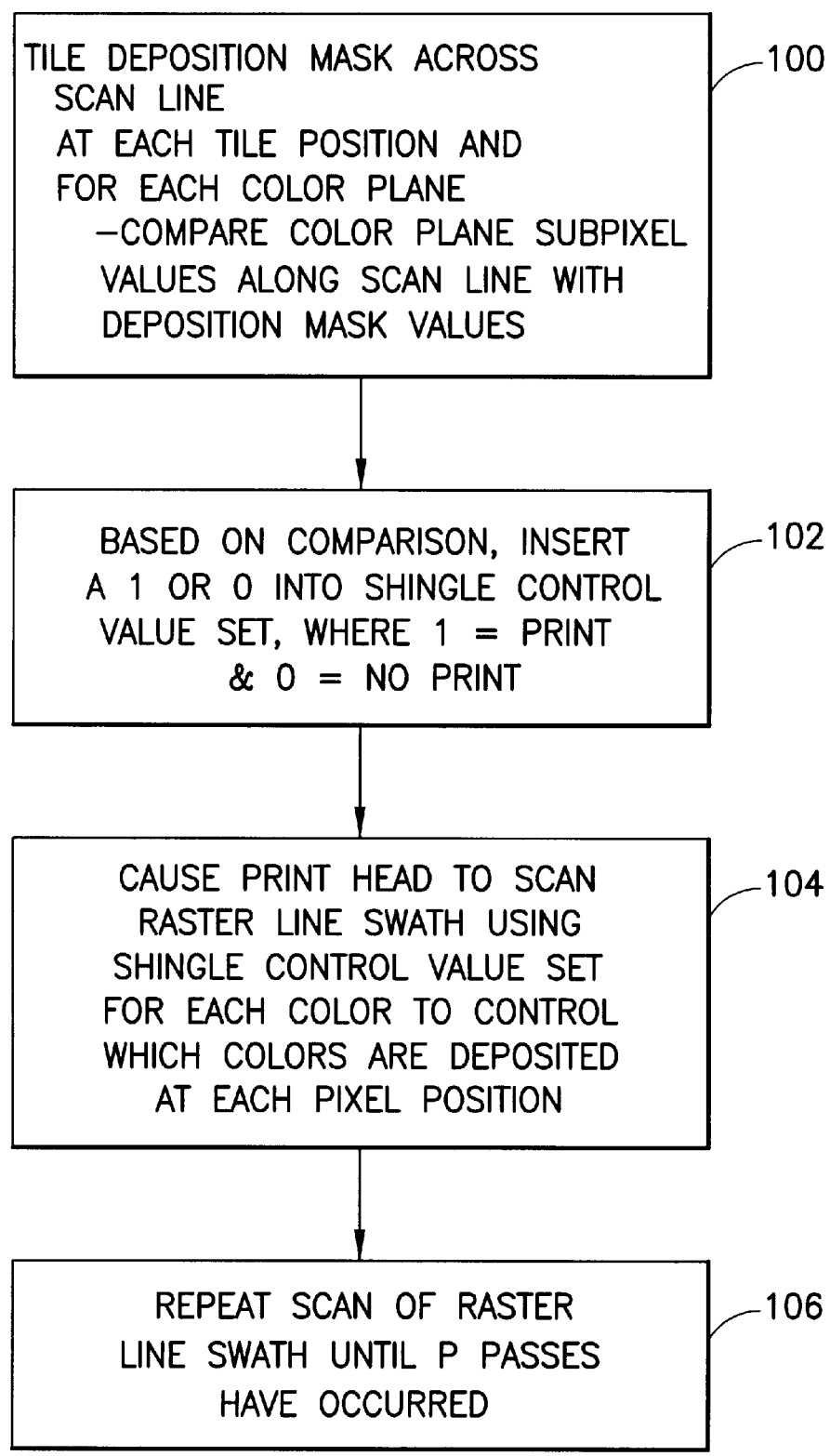
FIG. 6 is a logical flow diagram illustrating the overall operation of the invention.

Turning now to FIG. 6, a logical flow diagram illustrates the overall operation of the invention. Subsequent to a description of FIG. 6, a pseudo-code listing of the procedure is given, followed by two examples, one which describes a temporal shingling of a single colorant and a second which describes the operation of the invention in a spatial shingling action, for one colorant.

As shown in FIG. 6, print control procedure 70 causes a deposition mask to be tiled across a scan line and, at each tile position for each color plane, the color plane subpixel value is compared with the deposition mask threshold value (step 100). Based on that comparison, a 1 or a 0 is inserted into a corresponding shingle control value set for each color plane (step 102). Once a shingle control value set has been completed, the printhead is then scanned across the media sheet using the shingle control values for each color plane to control which color ink is deposited at each pixel position (step 104). Thereafter, the scan is repeated p times until all of the colors have been deposited for the scan line. Thereafter, the media sheet is incremented and the process repeats (step 106).

A pseudo-code listing which accomplishes the multi-past temporal and spatial shingling is as follows:

```
for each colorant (C) in the printer,
    for each pass (p) of the printhead (1 to n)
        for each pixel location (L)
            if input ≥ mask (C) (p) (L)
                output (C) (p) (L) = 1
            else: output (C) (p) (L) = 0
        end for
    end for
end for
```

The following is an example of a temporal shingling action wherein a single colorant is employed:
assume: 1 color;
up to 4 drops on a given pixel location;
4 passes to complete a swath (one drop each pass).
For each pass, there is a unique shingle mask that converts a multilevel input value to binary (1 drop or no drop)
example: input color value=2 mask=pass 1: 3 pass 2: 1 pass 3: 2 pass 4: 4
The algorithm is as follows:
if input≥mask=>output=1
    else=>output=0
    pass 1: 2≧3=>0
    pass 2: 2≧1=>1
    pass 3: 2≧2=>1
    pass 4: 2≧4=>0
For the above example, ink drops are deposited at passes 2 and 3.

The following is an example of spatial shingling wherein a single colorant is employed:
assume: 1 color;
up to 4 drops on a given pixel location (one drop each pass);
8 passes;
2 adjacent pixel locations with 2 sets of masks.
Example=input subpixel values=2, 4;
Two masks: pass 1: 1, 5
    pass 2: 5, 1
    pass 3: 4, 5
    pass 4: 5, 2
    pass 5: 3, 5
    pass 6: 5, 4
    pass 7: 2, 5
    pass 8: 5, 3
The algorithm proceeds as follows:
if: input≧mask=>output=1
    pass 1: 2≧1, 4<5=>1,0
    pass 2: 2<5, 4≧1=>0,1
    pass 3: 2<4, 4<5=>0,0
    pass 4: 2<5, 4≧2=>0,1
    pass 5: 2<3, 4<5=>0,0
    pass 6: 2<5, 4≧4=>0,1
    pass 7: 2≧2, 4<5=>1,0
    pass 8: 2<5, 4≧3=>0,1
The above examples illustrate how the use of the deposition masks 44 enable the printing/shingling of any color sequence or no color at any pixel site.

It should be understood that the foregoing description is only illustrative of the invention. Various alternatives and modifications can be devised by those skilled in the art without departing from the invention. For example, if a deposition mask threshold value is set sufficiently high, all printing can be inhibited at a corresponding pixel site, notwithstanding the color value. Accordingly, the present invention is intended to embrace all such alternatives, modifications and variances which fall within the scope of the appended claims.

What is claimed is:

1. A system for pixel processing in a p pass print mode printer, comprising:
   logic means for comparing relative values between encoded multi-level print data configured in N by n bit words indicative of n pixel color planes in the p pass print mode printer and corresponding mask data configured in N by n bit word shingle mask in the p pass print mode printer and for outputting print control signals in accord with said comparing; and multi-level shingling means responsive to said print control signals for processing individual pixel locations in said color plane in a spatial shingling mask mode and a temporal shingling mask mode, to either deposit or not deposit a specific color dot on a media sheet.

2. The system as recited in claim 1, wherein no more than a maximum volume of V of ink is allowed to be deposited as multiple overlaid ink layers on said media sheet; and wherein a inkjet printhead associated with said system is adjusted to deposit no more than V/p of said volume V at each subpixel site during a pass, where p is a number of passes made by said inkjet printhead over each subpixel site on said media sheet.

3. The system as recited in claim 1, wherein said multi-level shingling means comprises a raster memory that is configured to include subpixel control values for at least a portion of a scan line of subpixels for each said color plane, said subpixel control values including print/no print indications for each said subpixel location along said portion of a scan line.

4. The system as recited in claim 1, wherein said print control signals result in print and no print actions by a printhead along a raster scan line, a print signal resulting when a subpixel value exceeds or equals a threshold value against which it is compared by said logic means.

5. The system as recited in claim 4, wherein at least one shingle mask includes maximum threshold values, whereby said logic means causes a printhead to be inhibited from performing print actions at any subpixel location which logically corresponds in position to a position of one of said maximum threshold values.

6. A method for pixel processing in a p pass print mode printer, comprising:

comparing relative values between encoded multi-level print data configured in N by n bit words indicative of n pixel color planes in the p pass print mode printer and corresponding mask data configured in N by n bit word shingle mask in the p pass print mode printer and for outputting print control signals in accord with said comparing; and responding to said print control signals for processing individual pixel locations in said color plane in a spatial shingling mask mode and a temporal shingling mask mode, to either deposit or not deposit a specific color dot on a media sheet.

7. The method as recited in claim 6, wherein no more than a maximum volume of V of ink is allowed to be deposited as multiple overlaid ink layers on said media sheet, and wherein a inkjet printhead associated with said system is adjusted to deposit no more than V/p of said volume V at each subpixel site during a pass, where p is a number of passes made by said inkjet printhead over each subpixel site on said media sheet.

8. The method as recited in claim 6, wherein said print control signals result in print and no print actions by a printhead along a raster scan line, a print signal resulting when a subpixel value exceeds or equals a threshold value against which it is compared.

9. The system as recited in claim 8, wherein at least one shingle mask includes maximum threshold values, and said responding step causes a printhead to be inhibited from performing print actions at any subpixel location which logically corresponds in position to a position of one of said maximum threshold values.

* * * * *